(12) United States Patent
Freeman et al.

(10) Patent No.: US 7,533,274 B2
(45) Date of Patent: May 12, 2009

(54) REDUCING THE BOOT TIME OF A TCPA BASED COMPUTING SYSTEM WHEN THE CORE ROOT OF TRUST MEASUREMENT IS EMBEDDED IN THE BOOT BLOCK CODE

(75) Inventors: Joseph Wayne Freeman, Raleigh, NC (US); Steven Dale Goodman, Raleigh, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/712,237

(22) Filed: Nov. 13, 2003

(65) Prior Publication Data

US 2005/0108564 A1 May 19, 2005

(51) Int. Cl.
G06F 9/24 (2006.01)
G06F 9/22 (2006.01)
G06F 9/30 (2006.01)
(52) U.S. Cl. ........................... 713/189; 713/2
(58) Field of Classification Search ................ 713/1–2, 713/100, 189
See application file for complete search history.

(56) References Cited

U.S. PATENT DOCUMENTS

| | | | | |
|---|---|---|---|---|
| 6,138,236 | A | 10/2000 | Mirov et al. | 713/200 |
| 6,266,809 | B1 | 7/2001 | Craig et al. | 717/11 |
| 6,304,970 | B1 | 10/2001 | Bizzaro et al. | 713/200 |
| 6,493,807 | B1 | 12/2002 | Martwick | 711/163 |
| 6,581,159 | B1 * | 6/2003 | Nevis et al. | 713/2 |
| 2002/0152382 | A1 | 10/2002 | Xiao | 713/173 |
| 2002/0166061 | A1 | 11/2002 | Falik et al. | 713/200 |
| 2002/0169976 | A1 | 11/2002 | Schelling et al. | 713/200 |
| 2002/0169979 | A1 | 11/2002 | Zimmer | 713/200 |
| 2002/0194482 | A1 * | 12/2002 | Griffin et al. | 713/176 |
| 2003/0037231 | A1 | 2/2003 | Goodman et al. | 713/2 |
| 2003/0037244 | A1 | 2/2003 | Goodman et al. | 713/189 |
| 2003/0037246 | A1 | 2/2003 | Goodman et al. | 713/191 |
| 2004/0030877 | A1 * | 2/2004 | Frid | 713/1 |
| 2004/0186988 | A1 * | 9/2004 | Polyudov | 713/100 |
| 2004/0193865 | A1 * | 9/2004 | Nguyen et al. | 713/2 |

OTHER PUBLICATIONS

"Flash Lock Out," *IBM Technical Disclosure Bulletin*, vol. 38, No. 01, Jan. 1995, p. 343.

* cited by examiner

*Primary Examiner*—Gilberto Barron, Jr.
*Assistant Examiner*—Venkat Perungavoor
(74) *Attorney, Agent, or Firm*—Jason O. Piche, Esq.; Steven M. Greenberg, Esq.; Carey Rodriguez Greenberg & Paul LLP

(57) ABSTRACT

A method, computer program product and system for reducing the boot time of a TCPA based computing system. A flash memory in the TCPA based computing system may include a register comprising bits configured to indicate whether the segments of the flash memory have been updated. The flash memory may further include a table configured to store measurements of the segments of the flash memory. The flash memory may further include a boot block code that includes a Core Root of Trust for Measurement (CRTM). The CRTM may read the bits in the register to determine if any of the segments of the flash memory have been updated. The CRTM may further obtain the measurement values in the table for those segments that store the POST BIOS code that have not been updated thereby saving time from measuring the POST BIOS code and consequently reducing the boot time.

6 Claims, 4 Drawing Sheets

REDUCING THE BOOT TIME OF A TCPA BASED COMPUTING SYSTEM WHEN THE CORE ROOT OF TRUST MEASUREMENT IS EMBEDDED IN THE BOOT BLOCK CODE

TECHNICAL FIELD

The present invention relates to the field of trusted and secure computing systems, and more particularly to reducing the boot time of a Trusted Computing Performance Alliance (TCPA) based computing system when the Core Root of Trust Measurement (CRTM) is incorporated within the boot block code.

BACKGROUND INFORMATION

With the advent of personal computer system use in every day business transactions, the issue of computer security has become critical. Unsecured personal computers inhibit electronic business (e-business) because users are reluctant, justifiably so, to transmit highly personal and sensitive information to system which may be vulnerable to intruders or viruses. While many Personal Computer (PC) manufacturers have made individual strides towards increasing security by adding "smart cards" or embedded security chips to their new models, the lack of a concerted effort by the PC industry to develop security technology could prevent the evolution of this technology in a consistent and compatible way between manufacturers.

Recognizing this potential risk and the adverse effects it could have on inhibiting electronic commerce, an open alliance between major PC manufacturers was formed to develop and propose a standard that would adopt hardware and software technologies to strengthen security at the platform level. The open alliance, formerly known as the Trusted Computing Platform Alliance (TCPA) (currently referred to as the Trusted Computing Group (TCG) but will be referred to herein as the TCPA), has proposed a standard including new hardware, BIOS and operating system specifications so PC manufacturers can provide a more trusted and secure PC platform based on common industry standards, the details of which are provided in the TCPA PC Specific Implementation Specification, 1.00 RC1 (Aug. 16, 2001) (http://www.trustedcomputinggroup.org), hereby incorporated by reference.

A brief discussion of the boot process of a computing system is deemed appropriate here. Computing systems require a basic input/output system (BIOS) in order to operate. The BIOS is code that controls basic hardware operations, such as interactions with disk drives, hard drives and the keyboard.

When a computer resets or is initially powered-on, a boot process begins. First, a power on self test (POST) begins executing. POST is an initialization code which configures the system utilizing initialization settings stored in storage. Once POST has configured the system, BIOS then controls the basic operation of the hardware utilizing the hardware as it was configured by POST. The boot process is complete once an operating system has been handed control of the system. In order for the boot process to be complete, POST must complete its execution.

POST and BIOS may be both stored as a single flash image in a storage device such as a flash memory. This image may be referred to as the "boot code." If the flash image of POST and BIOS is corrupted, the boot of the system will not be able to be completed.

To recover from a defective flash image error, a system may include a boot block. A boot block may refer to an area within a flash memory containing code, referred to as the "boot block code," which includes a segment of code sufficient to bring the computer system up and to read a recovery image from a boot media or bootable device. In other words, the boot block code may be considered to be a self-contained "miniBIOS" with enough code so as to read the new BIOS image off a boot media or the like. The boot block code may be executed when a computer is powered up or reset.

FIG. 1 is a block diagram illustrating a TCPA computing system 100 in accordance with TCPA standards. As is shown, the PC architecture includes a system 10, platform 20, motherboard or planar 30, and trusted building block (TBB) 40. The system 10 includes the platform 20 and all post-boot components 12. Post-boot components 12 may include Initial Program Load (IPL) code 13, an operating system 14 (comprise the entire entity that performs actions for, or acts on behalf of, a user), drivers 15, services 16, applications 17 and peripherals 18, e.g., display, keyboard. Platform 20 presents and receives information to and from the user. Platform 20 includes motherboard 30 and peripherals 22 attached to motherboard 30. Peripherals 22 may include add-on cards 20, a case 21, a hard disk 23 and a floppy disk 24. Platform 20 may further include a power supply 19.

Motherboard 30 is provided by the manufacturer and includes one or more CPUs 32, a memory 33 and all primary peripheral devices 34, i.e., devices which directly attach to and directly interact with motherboard 30. In addition, motherboard 30 includes all BIOSes 36 (POST BIOS 36 stored in flash memory 42 outside TBB 40), embedded firmware 38 and TBB 40. TBB 40 is the center of the trusted platform, and includes a portion of a flash memory 42 storing a boot block code 50 which includes a Core Root of Trust for Measurement (CRTM) 52. TBB 40 further includes a Trusted Platform Module (TPM) 44, and a trusted connection 46 of CRTM 52 and TPM 44 to motherboard 30.

According to the TCPA specification, CRTM 52 and TPM 44 are the only trusted components on the motherboard 30, i.e., they are presumably secure and isolated from tampering by a third party vendor or software. Only the authorized platform manufacturer (or agent thereof) can update or modify code contained therein. CRTM 52 is the executable component of TBB 40 that gains control of the platform 20 upon a platform reset. Thus, for all types of platform resets, CPU 32 always begins executing CRTM code 52 within boot block code 50. The trust in the platform is based on CRTM 52, and trust in all measurements is based on its integrity.

The basic premise underlying the trusted platform is ensuring that untrusted devices or software have not been loaded onto the system. Trust is established during a pre-boot state that is initiated by a platform reset. The platform reset can either be a cold boot (power-on), a hardware reset, or a warm boot typically caused by a user keyboard input. Following a platform reset, CPU 32 executes code with CRTM's 52 platform initialization code. The chain of trust begins at CRTM 52.

In this architecture, the BIOS includes boot block code 50 and a POST BIOS 36. Boot block code 50 and POST BIOS 36 are independent components and each can be updated independent of the other. Boot block code 50 is located in a portion of flash memory 42 within TBB 46, while POST BIOS 36 is located in another portion of flash memory 42 outside TBB 40. Thus, while the manufacturer or a third party supplier may update, modify or maintain POST BIOS 36, only the manufacturer can modify or update boot block code 50.

As stated above, CRTM 52 and TPM 44 are presumptively trusted. Thus, following a platform reset, CRTM 52 in boot block code 50 is executed, which measures the entity to which it will transfer control, in this case, Post BIOS 36. "Measuring an entity" means hashing code in the entity to produce a log of the code, which is then extended into a platform configuration register (PCR) 48 in TPM 44. TPM 44 includes a plurality of PCRs 48 (48a-d), a portion of which are designated to the pre-boot environment and referred to collectively as boot PCRs 48a. Each boot PCR 48a is dedicated to collecting specific information related to a particular stage of a boot sequence. For example, one boot PCR 48a (PCR[0]) may store measurements from CRTM 52, POST BIOS 36, and all firmware 38 physically bound to the motherboard 30.

Once POST BIOS 36 has been measured, control is transferred to POST BIOS 36, which then continues to boot the system by ensuring that hardware devices are functional. Once POST BIOS 36 gains control, it is responsible for measuring any entity to which it will transfer control. As POST BIOS 36 progresses through the boot sequence, values in the boot PCRs 48a change whenever an entity is measured.

Upon booting to operating system (OS) 14, operating system 14 verifies the trustworthiness of platform 20 by comparing the values in the boot PCRs 48a with precalculated values known by operating system 14. If the values match, operating system 14 is assured of a secure boot and that the platform is trusted. If the values do not match, operating system 14 is alerted of a possible breach, and operating system 14 can take measures to reestablish trust.

As stated above, CRTM 52 performs a measurement of POST BIOS 36. The process in measuring code is computationally intensive and takes a significant amount of time. Since CRTM 52 is embedded within boot block code 50 in a TCPA computing system 100, the time in booting up such a system is increased as the TCPA specification requires CRTM 52 to perform its measurement of the POST BIOS 36.

Users have become accustomed to fast boot times that computer systems currently offer. However, by including CRTM 52 within boot block code 50 in a TCPA computing system 100, the boot time will be increased thereby possibly causing annoyance for the user.

Therefore, there is a need in the art to reduce the boot time of a Trusted Computing Performance Alliance (TCPA) based computing system when the Core Root of Trust Measurement (CRTM) is incorporated within the boot block code.

SUMMARY

The problems outlined above may at least in part be solved in some embodiments by including a register in the flash memory configured to store information indicating whether a segment of the flash memory has been updated since the last boot. Further, the flash memory may include a table configured to store pre-measured values of the POST BIOS conducted by the Core Root of Trust Measurement (CRTM). For those segments that have not been updated, the CRTM may, instead of measuring the POST BIOS code stored in those segments, obtain the pre-measured values of the POST BIOS code for those segments in the table thereby saving time from having to measure code. In this manner, the boot time of a Trusted Computing Performance Alliance (TCPA) based computing system when the CRTM is incorporated within the boot block code is reduced.

In one embodiment of the present invention, a method for reducing the boot time of a TCPA based computing system may comprise the step of resetting the TCPA computing system. The method may further comprise executing a boot block code comprising a Core Root of Trust Measurement (CRTM). The method may further comprise reading bits in a register of a flash memory storing the boot block code where the bits in the register indicate whether segments of the flash memory have been updated. The method may further comprise obtaining measurement values from a table storing hashed values from a previous measurement of a POST BIOS if one or more of the bits read in the register indicate the segments of the flash memory storing POST BIOS code have not been updated.

The foregoing has outlined rather generally the features and technical advantages of one or more embodiments of the present invention in order that the detailed description of the invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for reducing the boot time of a TCPA based computing system. In one embodiment of the present invention, a flash memory in the portion of the Trusted Building Block (TBB) in the TCPA based computing system may include a register comprising bits configured to indicate whether the segments of the flash memory have been updated. The flash memory may further include a table configured to store measurements of the segments of the flash memory. The flash memory may further include a boot block code that includes a Core Root of Trust for Measurement (CRTM). Upon resetting the TCPA based computing system, the boot block code may be executed. The CRTM in the boot block code may read the bits in the register of the flash memory to determine if any of the segments of the flash memory have been updated. The CRTM may further obtain the measurement values in the table for those segments of the flash memory that have not been updated that store POST BIOS code thereby saving time from measuring the POST BIOS code in those segments. By not having to measure the POST BIOS code in one or more segments of the flash memory, the boot time of a TCPA based computing system with the CRTM incorporated within the boot block code is reduced.

Although the present invention is described with reference to a TCPA computing system, it is noted that the principles of the present invention may be applied to Option ROMs on adapter cards. It is further noted that embodiments applying the principles of the present invention to such adapter cards, would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
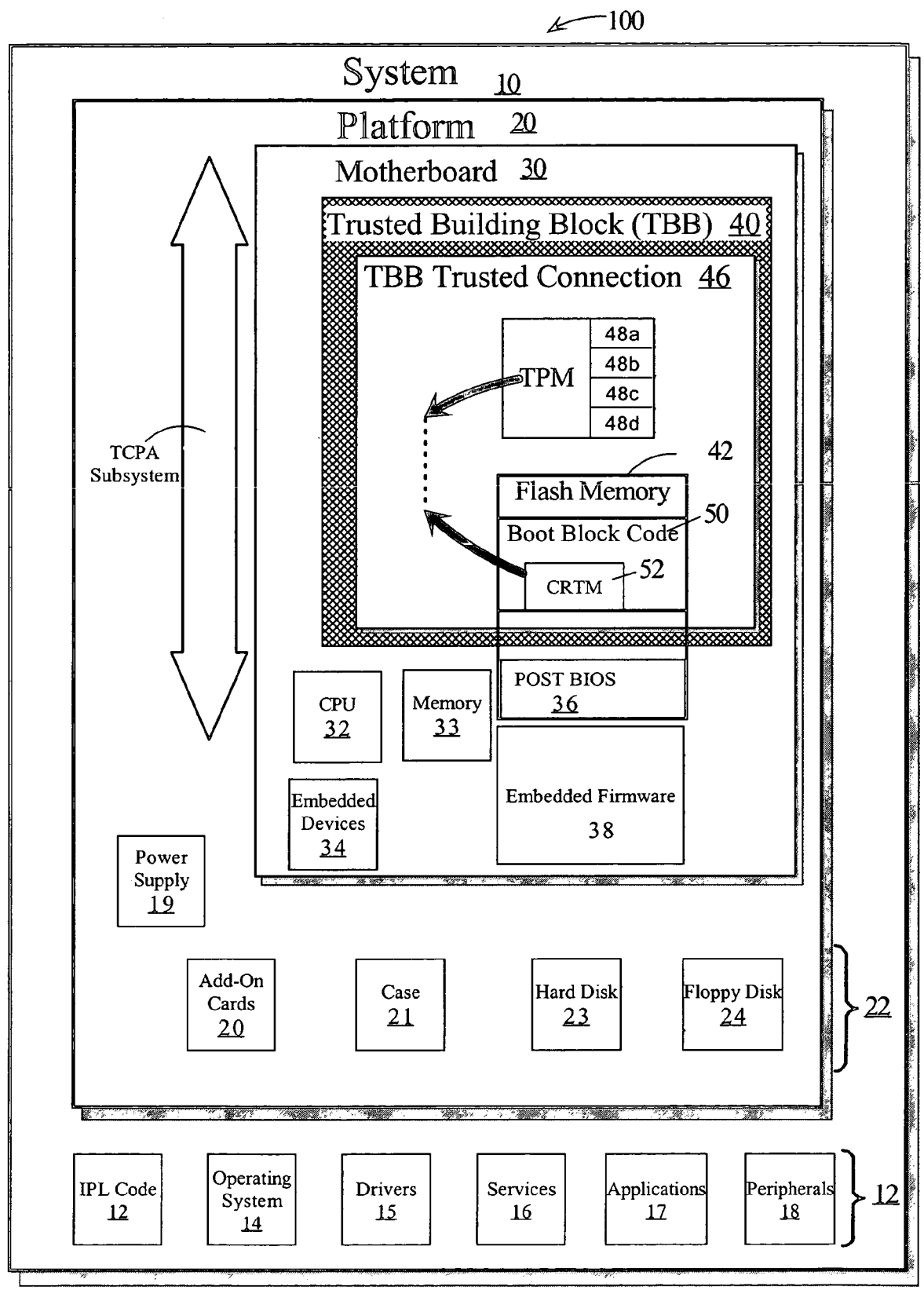
FIG. 1 illustrates an embodiment of the present invention of a Trusted Computing Performance Alliance (TCPA) based computing system.
Figure 2:
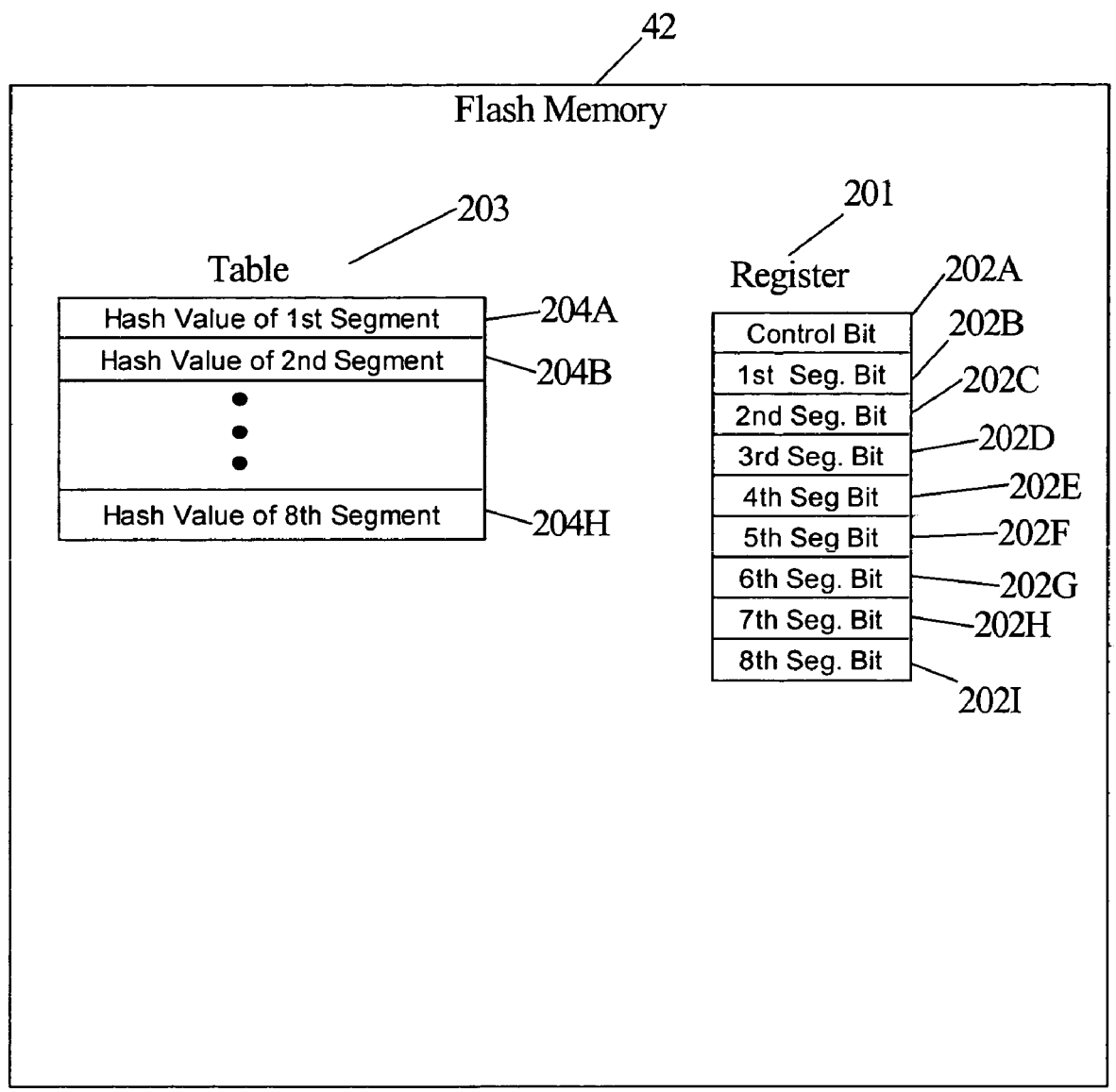
FIG. 2 illustrates an embodiment of the present invention of a flash memory in the TCPA based computing system.
Figure 3:
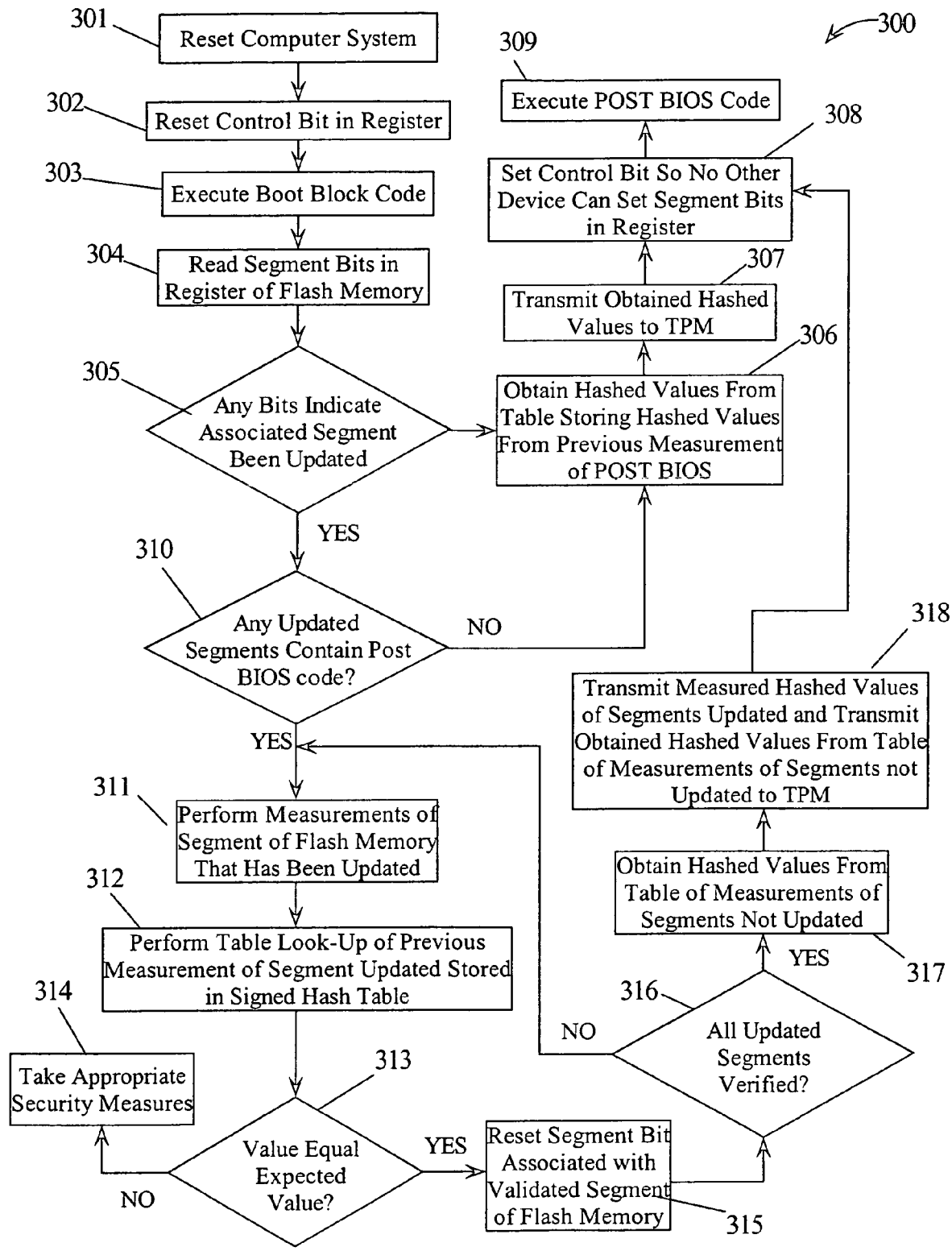
FIG. 3 is a flowchart of a method for reducing the boot time of a TCPA based computing system when the CRTM is incorporated within the boot block code in accordance with an embodiment of the present invention.
Figure 4:
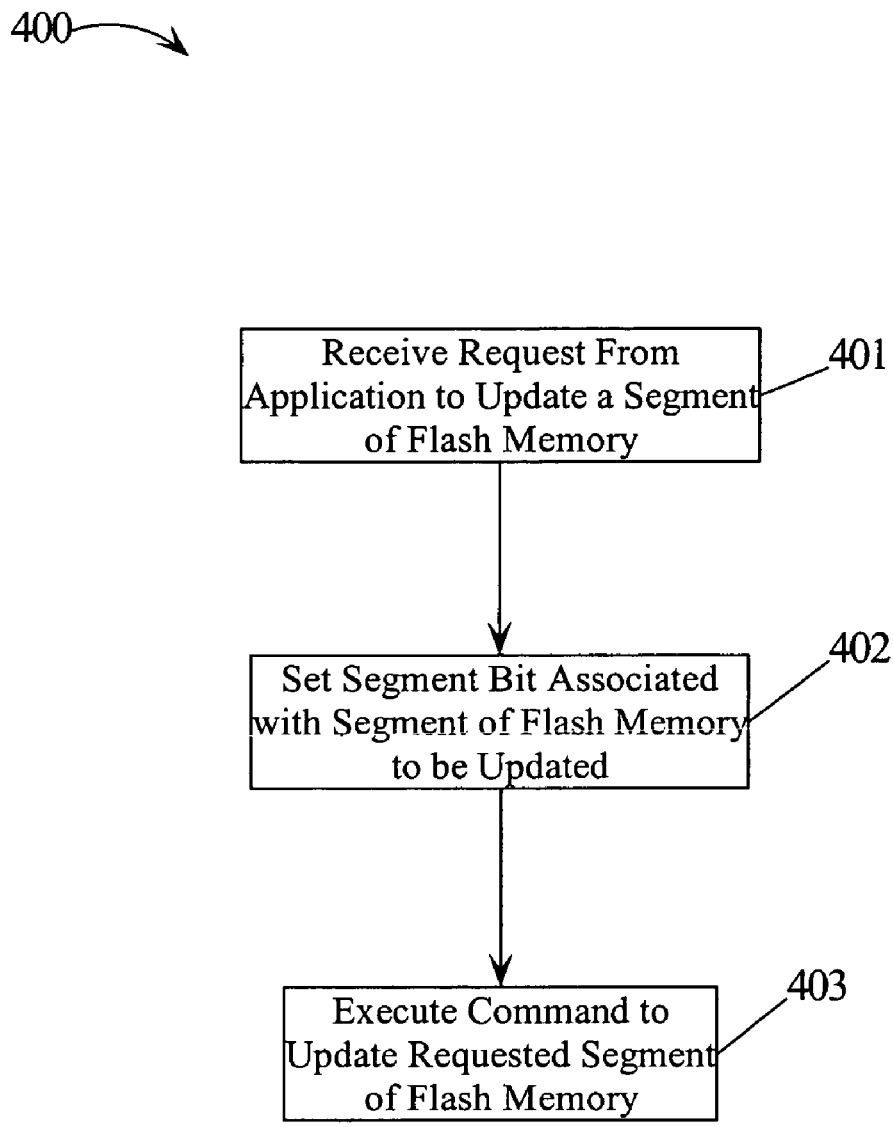
FIG. 4 is a flowchart of a method for setting a segment bit to indicate that its associated segment of the flash memory has been updated in accordance with an embodiment of the present invention.

As stated in the Background Information section, users have become accustomed to fast boot times that computer systems currently offer. However, by including CRTM 52 (FIG. 1) within boot block code 50 (FIG. 1) in a TCPA computing system 100 (FIG. 1), the boot time will be increased thereby possibly causing annoyance for the user. Therefore, there is a need in the art to reduce the boot time of a TCPA based computing system when the CRTM is incorporated within the boot block code. The boot time of TCPA based computing system 100 may be reduced when CRTM 52 is incorporated within boot block code 50 by including a register in flash memory 42 (FIG. 1) to store information indicating whether a segment of flash memory 42 has been updated since the last boot. Further, the boot time of TCPA based computing system 100 may be reduced when CRTM 52 is incorporated within boot block code 50 by including a hash table in flash memory 42 that stores pre-measured values of POST BIOS 36 (FIG. 1) conducted by CRTM 52 (FIG. 1). The register and hash table are described below in association with FIGS. 2-4. FIG. 2 is a diagram illustrating an embodiment of the present invention of flash memory 42 including the register and table discussed above. Further, the method for reducing the boot time of a TCPA based computing system using the register and hash table is described below in association with FIG. 3. FIG. 3 is a flowchart of a method for reducing the boot time of a TCPA based computing system. FIG. 4 is a flowchart of a method for setting a segment bit to indicate that a segment of flash memory 42 has been updated.

Prior to discussing FIGS. 2-4, it is noted that TCPA computing system 100 (FIG. 1) comprises CPU 32 (FIG. 1) coupled to TBB 46 (FIG. 1) containing flash memory 42 which stores CRTM 52 embedded in boot block code 50. CPU 32 may be configured to execute the instructions of CRTM 52 that may be loaded in memory 33 (FIG. 1) where these instructions are described as steps performed by CRTM 52 in FIG. 3. It is further noted that CPU 32 may be further configured to execute other instructions, e.g., execute POST BIOS, loaded in memory 33 that are involved in reducing the boot time of TCPA based computing system 100.

Implementations of embodiments of the present invention include implementations as a computer system programmed to execute the method or methods described herein, and as a computer program product. According to the computer system implementations, sets of instructions for executing the method or methods are resident in memory, e.g., memory 33, of one or more computer systems configured generally as described above. Until required by TCPA computing system 100, the set of instructions may be stored as a computer program product in another computer memory. Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 2—Flash Memory

FIG. 2 illustrates an embodiment of the present invention of a portion of flash memory 42 (FIG. 1) contained within TBB 46 (FIG. 1). Referring to FIG. 2, the portion of flash memory 42 contained within TBB 46 comprises a register 201 containing a plurality of entries 202A-I. Register 201 may be configured to store information indicating whether a segment of flash memory 42 has been updated since the last boot. Entries 202A-I may collectively or individually be referred to as entries 202 or entry 202, respectively. Each entry 202, except the one entry 202 designated as the "control bit" as discussed below, may be associated with a particular segment of flash memory 42. In one embodiment, flash memory 42 contains eight segments. Hence, there are nine entries 202, entries 202A-I, in register 201. The portion of flash memory 42 contained within TBB 46 may further comprise a table 203 configured to store pre-measured values of POST BIOS 36 (FIG. 1) conducted by CRTM 52 (FIG. 1). Table 203 may comprise entries 204A-H. Entries 204A-H may collectively or individually be referred to as entries 204 or entry 204, respectively. Each entry 204 may be associated with a particular segment of flash memory 42. In one embodiment, flash memory 42 contains eight segments. Hence, there are eight entries 204, entries 204A-H, in table 203. It is noted that flash memory 42 may contain any number of segments and hence register 201 and table 203 may comprise any number of entries 202, 204, respectively, and that FIG. 2 is illustrative. It is further noted that each entry 204 may contain more than one pre-stored value per segment. It is further noted that table 203 may not contain an entry 204 for a segment that contained no measurable data.

Referring to FIG. 2, each entry 202 in register 201 may have a field length of one bit. A plurality of the entries 202, entries 202B-I, may be referred to herein as the "segment bits." Segment bits may be used to indicate whether a particular segment of flash memory 42 has been updated since the last boot. For example, flash memory 42 may be divided into eight segments. Entry 202B may indicate whether the first segment has been updated since the last boot. Entry 202C may indicate whether the second segment has been updated since the last boot and so forth. A segment bit may indicate that its associated segment of flash memory 42 has been updated since the last boot by the placement of a logical one in its entry 202. Otherwise the segment bit may indicate a zero. It is noted that one of ordinary skill in the art would recognize that opposite logic may be used to indicate whether an associated segment in flash memory 42 has been updated since the last boot.

Entry 202A in register 201 may be referred to as the "control bit" which indicates whether any device can reset the segment bits (entries 202B-I). For example, the control bit may indicate that any device can reset the segment bits by the placement of a logical one in its entry 202A. The control bit may indicate that only CRTM 52 may reset the segment bits by the placement of a zero in its entry 202A. It is noted that one of ordinary skill in the art would recognize that opposite logic may be used to indicate whether any device can reset the segment bits.

As stated above, table 203 may be configured to store pre-measured values of POST BIOS 36 conducted by CRTM 52. As stated above, these pre-measured values are hashed values. Further, these hashed values may be signed with a key thereby making these values digital signatures.

As illustrated in FIG. 1, POST BIOS 36 is stored in the section of flash memory 42 residing outside TBB 46. POST BIOS 36 may be stored in particular segments of flash memory 42. For example, if flash memory 42 contained eight segments, then POST BIOS 36 may be stored in segments 4-8. As stated in the Background Information section, CRTM 52 performs a measurement of POST BIOS 36 following a platform reset. Measurement referred to herein means hashing the code in the segment read. These hashed values may be stored in table 203. For example, if POST BIOS 36 was stored in segments 4-8 in flash memory 42, then CRTM 52 would place the measurement values of segments 4-8 in table entries 204D-H, respectively. The other entries 204 in table 203 may be empty if those associated segments in flash memory 42 do not store any of POST BIOS 36. For example, a segment of flash memory 42 may be designated to store data, such as extended system configuration data (ESCD), and hence need not be measured by CRTM 52. Consequently, entry 204 associated with that segment may be empty. It is further noted that table 203 may not contain an entry 204 for a segment that contained no measurable data.

The method for reducing the boot time of a TCPA based computing system 100 (FIG. 1) when CRTM 52 is incorporated within boot block code 50 (FIG. 1) using register 201 and hash table 203 is described below in association with FIG. 3.

FIG. 3—Method for Reducing the Boot Time of a TCPA Based Computing System

FIG. 3 is a flowchart of a method for reducing the boot time of a TCPA based computing system 100 (FIG. 1) when CRTM 52 (FIG. 1) is incorporated within boot block code 50 (FIG. 1) in flash memory 42 (FIG. 1) in accordance with an embodiment of the present invention.

Referring to FIG. 3, in conjunction with FIGS. 1-2, in step 301, TCPA computing system 100 is reset. Reset may refer to either a cold boot (power-on), a hardware reset, or a warm boot typically caused by a user keyboard input.

In step 302, control bit 202A in register 201 is reset upon resetting of TCPA computing system 100. In one embodiment, the resetting of control bit 202A is automatically reset by circuitry within flash memory 42 upon receipt of a reset signal.

In step 303, boot block code 50 including CRTM 52 is executed. In step 304, CRTM 52 in boot block code 50 reads the segment bits, i.e., entries 202B-I, in register 201 to determine if any of the segments in flash memory 42 had been updated since the last boot. A method for setting a segment bit to indicate that its associated segment of flash memory 42 has been updated is discussed further below in association with FIG. 4. In step 305, CRTM 52 determines if any of the bits read indicate a segment of flash memory 42 has been updated since the last boot.

If none of the bits read indicate a segment of flash memory 42 as having been updated, then, in step 306, CRTM 52 obtains the hashed values from table 203 storing the hashed values from previous measurements of POST BIOS 36. As stated above, the hashed values from previous measurements of POST BIOS 36 may be stored in particular entries 204 of table 203 as POST BIOS 36 may be stored in particular segments of flash memory 42. CRTM 52 may be configured to obtain the previous measurement of POST BIOS 36 from those specific entries 204 of table 203 storing the previous measurements. By obtaining the previous measurement of POST BIOS 36 from table 203 instead of measuring POST BIOS 36, time is saved from CRTM 52 not having to measure POST BIOS 36. By saving time from not having to measure POST BIOS code 36, there is a reduction in the boot time of TCPA computing system 100.

In step 307, CRTM 52 transmits the obtained hashed values to TPM 44 via a trusted connection 46. As stated in the Background Information section, TPM 44 may refer to a piece of hardware in TBB 46 that is configured to implement the standards defined in the TCPA PC Specific Implementation Specification, 1.00 RC1 (Aug. 16, 2001) (http://www.trustedcomputinggroup.org). In particular, TPM 44 may be configured to maintain the integrity of TCPA computing system 100 by implementing cryptographic algorithms. Upon receiving these hashed values, TPM 44 may be configured to updated the boot PCRs 48a storing the outdated values. In one embodiment, TPM 44 may update the boot PCRs 48a by performing the Secure Hash Algorithm-1 (SHA-1 algorithm) on both the outdated values and the received hashed values as described in greater detail in the TCPA PC Specific Implementation Specification, 1.00 RC1 (Aug. 16, 2001) (http://www.trustedcomputinggroup.org).

In step 308, CRTM 52 sets control bit 202A so that no other device but CRTM 52 can reset the segment bits (entries 202B-I) in register 201. For example, CRTM 52 may set the value in control bit 202A to a logic value of one thereby preventing other devices from resetting the segment bits. That is, CRTM 52 may set control bit 202A so that no other device can clear a segment bit to indicate that an updated segment is valid as discussed further below. Other devices may set the segment bit to indicate that its associated segment has been updated. In step 309, processor 32 executes the instructions of POST BIOS 36.

If, however, a bit read in the segment bits indicate a segment of flash memory 42 as having been updated, then, in step 310, CRTM 52 determines if any of the updated segments store POST BIOS code 36. If none of the segments updated store POST BIOS code 36, e.g., stores configuration data such as ESCD, then, CRTM 52, in step 306, obtains the hashed values from table 203 storing the hashed values from previous measurements of POST BIOS 36 from those segments of flash memory 42 storing POST BIOS code 36. By not having to measure updated segments of flash memory 42 containing data, e.g., ESCD, instead of POST BIOS code 36, the boot time is reduced. Further, as stated above, by obtaining the previous measurement of POST BIOS 36 from table 203 instead of measuring POST BIOS 36, time is saved from CRTM 52 not having to measure POST BIOS 36. By saving time from not having to measure POST BIOS code 36, there is a reduction in the boot time of TCPA computing system 100.

If, however, one or more of the updated segments contain POST BIOS code 36, then, in step 311, CRTM 52 performs a measurement of the segment updated containing POST BIOS code 36. In step 312, CRTM 52 performs a table look-up of table 203 to obtain the previous measurement of that updated segment. For example, if segment #5 of flash memory 42 was updated and it contained POST BIOS code 36, then CRTM 52 may measure segment #5 of flash memory 42 in step 311 as well as perform a table look-up of the previous measurement of segment #5 of flash memory 42 stored in entry 204E of table 203.

In step 313, CRTM 52 determines if the measured value in step 311 equals the value previously measured, i.e., the expected value looked-up in table 203, obtained in step 312. If these two values do not equal, then POST BIOS 36 may no longer be trusted as the source of the modifications may be unknown. Consequently, if these two values do not equal, then CRTM 52, in step 314, takes appropriate security measures. For example, CRTM 52 may send an alert to a display (display may be part of peripherals 18 as indicated in the post-boot components 12) indicating that flash memory 42 has been tampered with. In another example, flash memory 42 may be reloaded.

If, however, the two values equal, then the segment associated with those values has been validated. That is, POST BIOS code 36 in that updated segment of flash memory 42 is valid. If the updated segment is validated, then, in step 315, CRTM 52 resets the segment bit (entry 202B-I) associated with the updated segment of flash memory 42. For example, CRTM 52 may reset the segment bit associated with the updated segment of flash memory 42 to indicate a value of zero thereby indicating that the associated segment is valid.

In step 316, CRTM 52 determines if all the updated segments of flash memory 42 have been verified. If there is another updated segment of flash memory 42 that needs to be verified, then, in step 311, CRTM 52 performs a measurement of another updated segment containing POST BIOS code 36.

If, however, there are no more updated segments of flash memory 42 that need to be verified, then, in step 3.17, CRTM 52 obtains the hashed values from table 203 of those previous measurements of segments not updated containing POST BIOS code 36. As stated above, the hashed values from previous measurements of the POST BIOS 36 may be stored in particular entries 204 of table 203 as POST BIOS 36 may be stored in particular segments of flash memory 42. CRTM 52 may be configured to obtain the previous measurement of those segments not updated containing POST BIOS code 36 from specific entries 204 of table 203.

In step 318, CRTM 52 transmits the measured hashed values of those segments of flash memory 42 updated as well as transmits the obtained hashed values from table 203 of those segments of flash memory 42 not updated to TPM 44 via a trusted connection 46. Upon receiving these hashed values, TPM 44 may be configured to updated the boot PCRs 48a storing the outdated values. In one embodiment, TPM 44 may update the boot PCRs 48a by performing the SHA-1 algorithm on both the outdated values and the received hashed values as described in greater detail in the TCPA PC Specific Implementation Specification, 1.00 RC1 (Aug. 16, 2001) (http://www.trustedcomputinggroup.org).

Alternative to performing steps 317-318, CRTM 52 may, in an alternative embodiment, obtain the hashed values of measurements from table 203 of those segments updated and not updated that contain POST BIOS code 36. These obtained hashed values may be transmitted to TPM 44 via trusted connection 46.

Once TPM 44 receives the hashed values from CRTM 52, CRTM 52, in step 308, sets control bit 202A so that no other device but CRTM 52 can set the segment bits (entries 202B-I) in register 201 as explained above.

It is noted that method 300 may include other and/or additional steps that, for clarity, are not depicted. It is further noted that method 300 may be executed in a different order presented and that the order presented in the discussion of FIG. 3 is illustrative. It is further noted that certain steps in method 300 may be executed in a substantially simultaneous manner.

FIG. 4—Method for Setting Segment Bit Indicating Associated Segment of Flash Memory has Been Updated FIG. 4 is a flowchart of one embodiment of the present invention of a method 400 for setting a segment bit to indicate that its associated segment of flash memory 42 (FIG. 1) has been updated.

Referring to FIG. 4, in conjunction with FIGS. 1-2, in step 401, flash memory 42 receives a request from an application 17 to update a segment of flash memory 42.

In step 402, the segment bit (entry 202B-I) associated with the segment of flash memory 42 to be updated is set. In one embodiment, the circuitry within flash memory 42 sets the segment bit associated with the segment of flash memory 42 to be updated. For example, the segment bit associated with the segment of flash memory 42 to be updated may be set to a logical value of one thereby indicating that its associated segment of flash memory 42 will be updated.

In step 403, flash memory 42 executes the received command to update the requested segment of flash memory 42.

It is noted that method 400 may include other and/or additional steps that, for clarity, are not depicted. It is further noted that method 400 may be executed in a different order presented and that the order presented in the discussion of FIG. 4 is illustrative. It is further noted that certain steps in method 400 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for reducing the boot time of a Trusted Computing Performance Alliance (TCPA) based computing system comprising the steps of:

resetting said TCPA computing system;

executing a boot block code comprising a Core Root of Trust for Measurement (CRTM);

reading bits in a register of a flash memory storing said boot block code, wherein said bits in said register indicate whether segments of said flash memory have been updated;

obtaining one or more measurement values from a table storing hashed values from a previous measurement of a Power On Self Test (POST) Basic Input/Output System (BIOS) if one or more of said bits read in said register indicate one or more of said segments of said flash memory storing said POST BIOS have not been updated; and, transmitting said obtained measurement values to a Trusted Platform Module.

2. The method as recited in claim 1 further comprising the steps of:

setting a control bit in said register so no other device can set said bits read in said register; and executing said POST BIOS.

3. The method as recited in claim 1 further comprising the steps of:

performing a measurement of a segment of said flash memory storing said POST BIOS which is indicated by a bit in said register as having been updated;

performing a look-up in said table of a previous measurement of said segment updated of said flash memory storing said POST BIOS; and comparing said measured value with said looked-up value in said table.

4. The method as recited in claim 3 further comprising the step of:

taking appropriate security measures if said measured value is not equal with said looked- up value in said table.

5. The method as recited in claim 3 further comprising the step of:

resetting said bit in said register to indicate that said segment of said flash memory is validated if said measured value is equal with said looked-up value in said table.

6. The method as recited in 5 further comprising the step of: transmitting said measured value of said segment of said flash memory updated and said obtained measurement values of one of more of said segments of said flash memory storing said POST BIOS that have not been updated to a Trusted Platform Module.

* * * * *